(12) United States Patent
Porras et al.

(10) Patent No.: US 11,391,398 B2
(45) Date of Patent: Jul. 19, 2022

(54) FUEL SYSTEM INCLUDING REINFORCED FUEL CONNECTOR WITH RETAINING RINGS

(71) Applicant: DELPHI TECHNOLOGIES IP LIMITED, St. Michael (BB)

(72) Inventors: Luis Manuel Porras, Chihuahua (MX); Javier Alfonso Sanchez, Chihuahua (MX); César Cain Chávez Sandoval, Chihuahua (MX); Isai Chavez, Anthony, NM (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 454 days.

(21) Appl. No.: 16/287,441

(22) Filed: Feb. 27, 2019

(65) Prior Publication Data
US 2020/0271250 A1    Aug. 27, 2020

(51) Int. Cl.
| | |
|---|---|
| *F16L 13/14* | (2006.01) |
| *F02M 37/44* | (2019.01) |
| *B01D 35/00* | (2006.01) |
| *B01D 35/30* | (2006.01) |
| *F02M 37/00* | (2006.01) |
| *F02M 37/04* | (2006.01) |
| *F16L 33/00* | (2006.01) |
| *F16L 11/10* | (2006.01) |
| *F16L 11/08* | (2006.01) |

(52) U.S. Cl.
CPC .......... *F16L 13/147* (2013.01); *B01D 35/005* (2013.01); *B01D 35/30* (2013.01); *F02M 37/0017* (2013.01); *F02M 37/04* (2013.01); *F02M 37/44* (2019.01); *F16L 33/00* (2013.01); *F16L 33/003* (2013.01); *F16L 11/08* (2013.01); *F16L 11/10* (2013.01)

(58) Field of Classification Search
CPC ....... F16L 13/147; F16L 33/227; F16L 11/10; F16L 33/003; F02M 37/44; F02M 37/0017; F02M 37/04; B01D 35/005; B01D 35/30
USPC ......................................... 285/239, 240, 252
See application file for complete search history.

(56) References Cited

U.S. PATENT DOCUMENTS

| | | | |
|---|---|---|---|
| 4,537,183 A * | 8/1985 | Fogarty | A61B 17/12099 128/DIG. 25 |
| 4,826,477 A * | 5/1989 | Adams | A61M 39/12 285/242 |
| 4,972,875 A | 11/1990 | Beer et al. | |
| 5,312,138 A | 5/1994 | Patera et al. | |
| 6,155,302 A | 12/2000 | Fischerkeller et al. | |

(Continued)

FOREIGN PATENT DOCUMENTS

| | | |
|---|---|---|
| DE | 3543717 A1 | 6/1987 |
| DE | 29720516 U1 | 4/1998 |

(Continued)

*Primary Examiner* — James M Hewitt, II
(74) *Attorney, Agent, or Firm* — Joshua M. Haines

(57) ABSTRACT

A fuel connector of a fuel system is adapted to flow fuel, and includes male and female components. The male component includes a plurality of barbs each projecting radially outward, spaced axially from one-another and being circumferentially continuous. The female component includes a plurality of reinforcement rings being in a predefined axial relationship to the respective plurality of barbs when connected.

17 Claims, 5 Drawing Sheets

(56) References Cited

U.S. PATENT DOCUMENTS

| | | | | |
|---|---|---|---|---|
| 6,308,992 B1* | 10/2001 | Mitsui | ............... | F16L 33/30 |
| | | | | 285/133.11 |
| 6,588,449 B1 | 7/2003 | Kippe | | |
| 8,342,578 B2* | 1/2013 | Bobenhausen | ......... | F16L 33/02 |
| | | | | 285/23 |
| 2002/0053567 A1 | 5/2002 | Beyer et al. | | |
| 2003/0146619 A1* | 8/2003 | Souvatzidis | ............ | F16L 37/56 |
| | | | | 285/124.5 |
| 2004/0155459 A1* | 8/2004 | Katayama | ............... | F16L 31/00 |
| | | | | 285/256 |
| 2004/0195830 A1 | 10/2004 | Gilmour | | |
| 2004/0222631 A1* | 11/2004 | Baxi | ............... | F16L 33/025 |
| | | | | 285/252 |
| 2006/0138770 A1* | 6/2006 | Miyajima | ............... | F16L 33/30 |
| | | | | 285/239 |
| 2008/0087349 A1 | 4/2008 | Holtz | | |
| 2016/0028176 A1 | 1/2016 | Eickstadt | | |

FOREIGN PATENT DOCUMENTS

| | | |
|---|---|---|
| DE | 19642580 A1 | 6/1998 |
| DE | 102008004152 A1 | 8/2008 |
| DE | 102012223994 A1 | 6/2014 |

* cited by examiner

FUEL SYSTEM INCLUDING REINFORCED FUEL CONNECTOR WITH RETAINING RINGS

BACKGROUND OF THE INVENTION

The present disclosure relates to a fuel system, and more particularly, to a reinforced fuel connector of the fuel system.

Known fuel connectors include multiple parts such as O-rings, clamps, and/or snaps contributing toward costs and less than optimal packaging issues.

Accordingly, it is desirable to provide a more robust fuel connector with less parts, reduced costs, and improvements in packaging.

SUMMARY OF THE INVENTION

In one, exemplary and non-limiting, embodiment of the present disclosure, a fuel connector of a fuel system is adapted to flow fuel. The fuel system includes male and female components. The male component includes a plurality of barbs each projecting radially outward, spaced axially from one-another and being circumferentially continuous. The female component includes a plurality of reinforcement rings being in a predefined axial relationship with the respective plurality of barbs when connected.

In another embodiment, a fuel connector is adapted to flow fuel, and includes a male component, and a female component. The male component includes a tubular portion and a circumferentially continuous barb. The male component defines a channel for the flow of fuel along a centerline. The barb projects radially outward from the tubular portion. The female component including a tubular segment and a reinforcement ring. The tubular segment defines a cavity extending along the centerline, and is adapted to receive the male component. The reinforcement ring is circumferentially continuous and projects radially outward from the tubular segment. The reinforcement ring is a unitary part of the tubular segment, and is axially located behind the barb when the fuel connector is coupled.

In another embodiment, a fuel system includes a fuel connector, a fuel filter, and a fuel fitting. The connector includes male and female components. The male component includes a tubular portion defining a channel for the flow of fuel along a centerline, and a circumferentially continuous barb projecting radially outward from the tubular portion. The female component includes a tubular segment and a reinforcement ring. The tubular segment defines a cavity extending along the centerline and adapted to receive the male component. The reinforcement ring is circumferentially continuous and projects radially outward from the tubular segment. The reinforcement ring is a unitary part of the tubular segment and is axially located behind the barb with respect to an insertion direction of the male component and when the first fuel connector is coupled. The fuel connector is carried between the fuel filter and the fuel fitting, thereby providing fluid communication between the fitting and the fuel filter.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
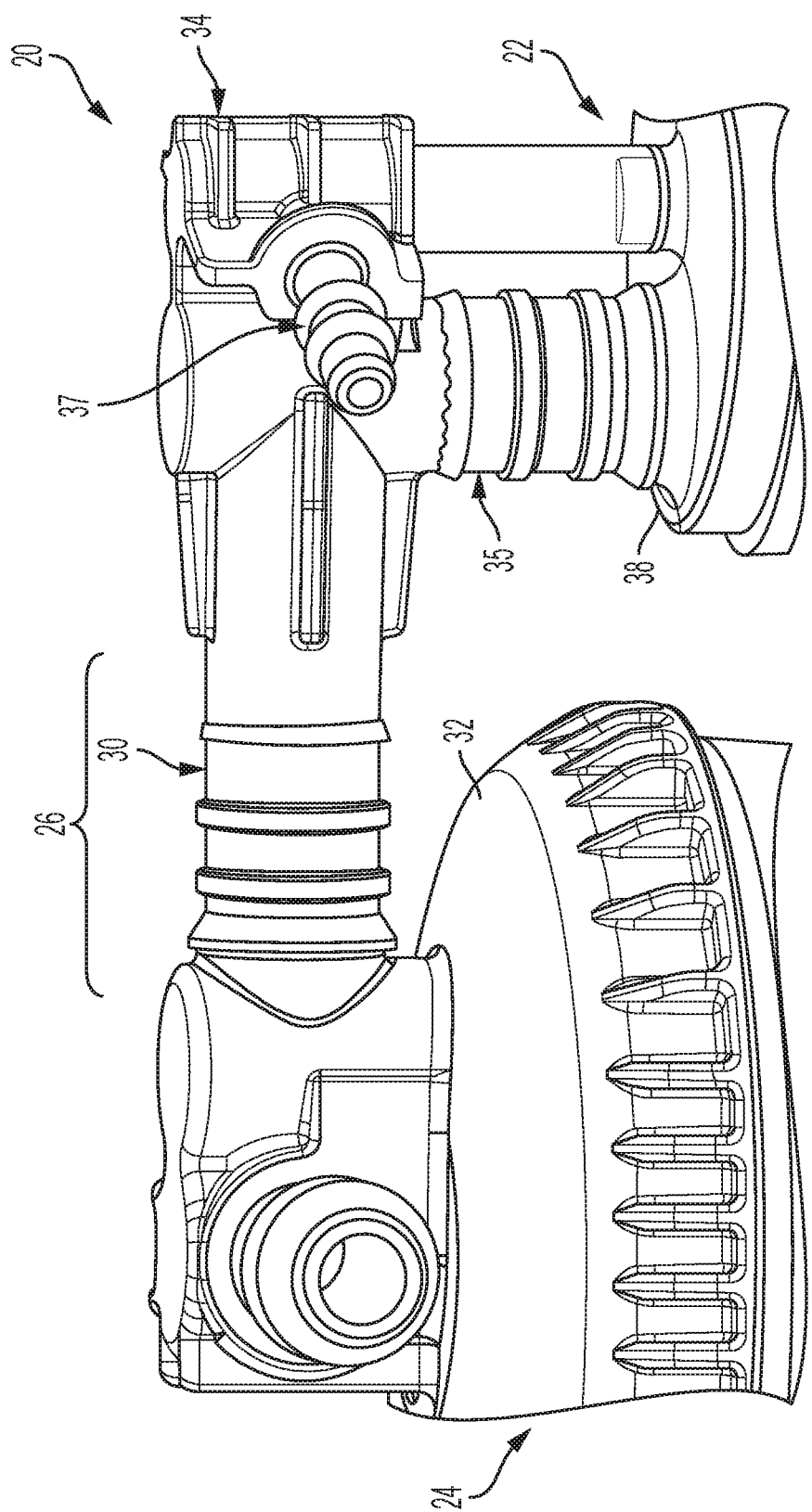
FIG. 1 is a partial perspective view of a fuel system utilizing a fuel connector as one, non-limiting, exemplary embodiment of the present disclosure.

Referring now to the Figures, where the invention will be described with reference to specific embodiments, without limiting same, at least a portion of a fuel system 20 is illustrated in FIG. 1. As one, non-limiting, example, such fuel systems may be utilized in the automotive industry to deliver fuel to a combustion engine (not shown). In this and other applications, the fuel system 20 may include a fuel pump 22 and a fuel filter 24.

Figure 2:
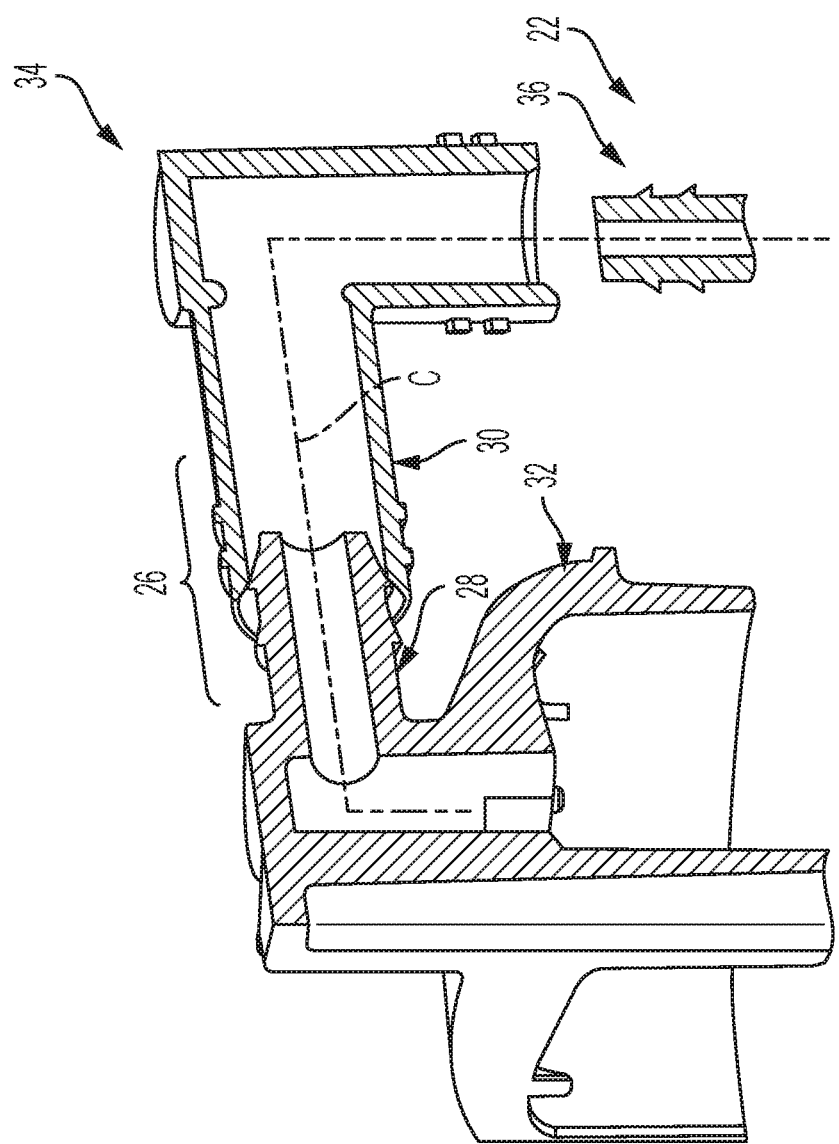
FIG. 2 is a perspective cross section of the fuel system.

Referring to FIGS. 1 and 2, to facilitate fuel flow from the fuel pump 22 to the fuel filter 24 (or vice-versa), the fuel system 20 includes a fuel connector 26 that may be generally carried by, and between, the pump and the filter. The fuel connector 26 includes a male component 28 and a female component 30. In one embodiment, the male component 28 may be an integral and unitary part of a filter housing 32 of the fuel filter 24. The female component 30 may be an integral and unitary part of a multi-ported fuel fitting 34 adapted, for example, to press fit about a fuel pump outlet nozzle 36 that may be an integral and unitary part of a pump housing 38. In one embodiment, the fuel pump outlet nozzle 36 and the portion of the fuel fitting (i.e., port) that press fits to the fuel pump outlet nozzle 36 may be considered as a second fuel connection. In yet another embodiment, the fuel fitting 34 may be an integral and unitary part of the pump housing 38.

In other embodiments, the fuel fitting 34 may include one or more male components 28 and/or one or more female components 30 adapted to connect to any number of fuel system elements. For example, the fitting illustrated in FIG. 1 includes the female component 30, as previously described, a second female component 35 adapted to connect to the fuel pump outlet nozzle 36 (i.e. male component) associated with the pump housing 38, and a male component 37 adapted to connect to a female component of a jet pump (not illustrated).

In one embodiment, the filter housing 32 may be a unitary, single, and homogeneous part made, for example, of injection molded plastic. Similarly, the fuel fitting 34 may be a unitary, single, and homogeneous part made of injection molded plastic. In yet another example, one or both of the components 28, 30 may be made of an acetal conductive copolymer.

Figure 3:
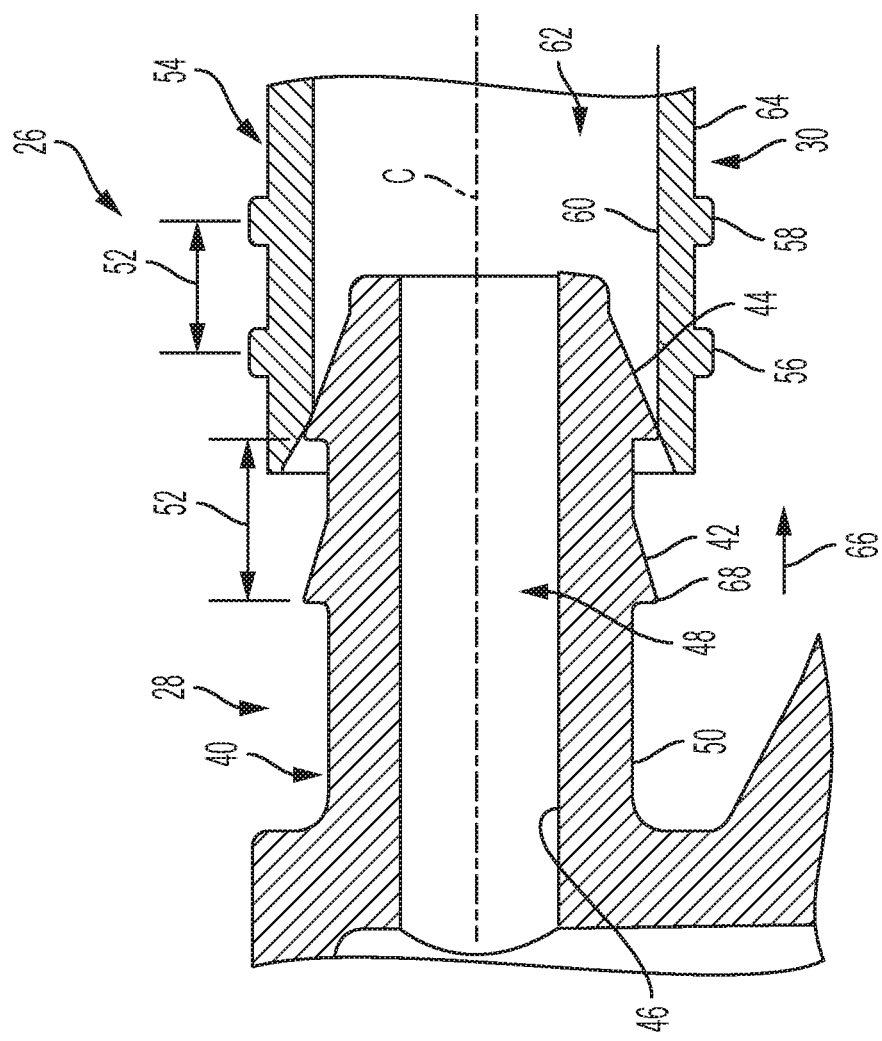
FIG. 3 is a cross section of the fuel connector of the fuel system when partially connected.

Referring to FIGS. 2 and 3, the male component 28 of the fuel connector 26 includes a tubular portion 40 and at least one barb (i.e., two illustrated as 42, 44). The tubular portion 40 includes an inner surface 46 that defines a channel 48 for the flow of fuel along a centerline C, and an opposite outer surface 50 that faces radially outward with respect to the centerline C. Each barb 42, 44 is engaged to, and projects radially outward from the outer surface 50. The barbs 42, 44 and the outer surface 50 circumferentially extend continuously about the centerline C. Barb 42 is axially spaced from barb 44 by an axial distance (see arrow 52 in FIG. 3). In one embodiment, the at least one barb 42, 44 is a plurality of barbs that is generally referred to as a fir tree arrangement.

The female component 30 of the fuel connector 26 includes a segment 54 that may be tubular and at least one reinforcement ring (i.e., two illustrated as 56, 58). The tubular segment 54 includes an inner face 60 that defines a cavity 62 for receipt of the male component 28 in an axial direction with respect to the centerline C, and an opposite outer face 64 that faces radially outward with respect to the centerline C. In one example, each reinforcement ring 56, 58 is engaged to, and projects radially outward from the outer face 64. The reinforcement rings 56, 58 and the outer face 64 circumferentially extend continuously about the centerline C. Reinforcement ring 56 is axially spaced from the reinforcement ring 58 by the same axial distance 52 measured between the barbs 42, 44. The reinforcement rings 56, 58 provide increased strength to female component 30 at the location of reinforcement rings 56, 58, and therefore increased resistance to deformation, compared to the portions of female component 30 that are immediately ahead of and behind reinforcement rings 56, 58.

Figure 4:
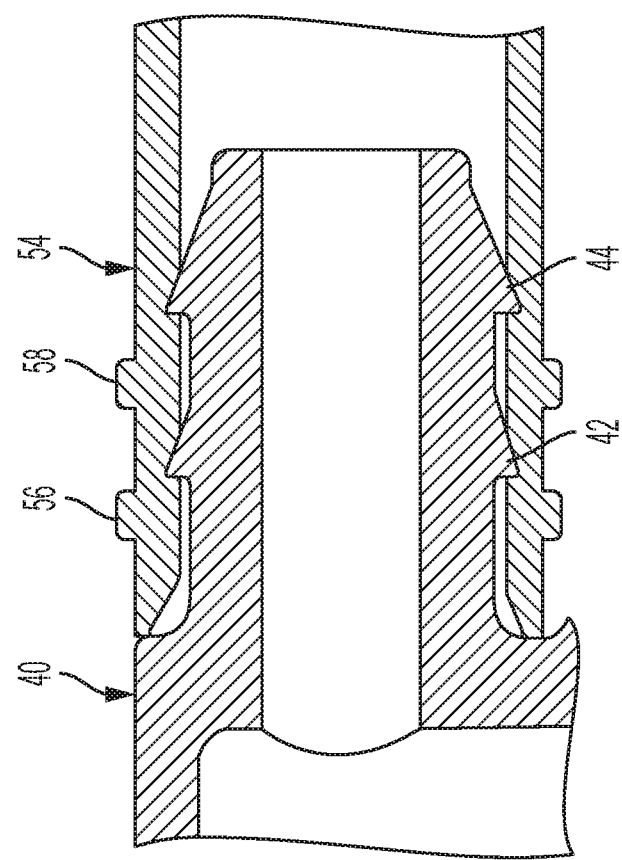
FIG. 4 is a cross section of the fuel connector when fully connected.

Referring to FIG. 3, each barb 42, 44 is ramped for axial insertion (see arrow 66 representing an insertion direction in FIG. 3) of the male component 28 into the cavity 62 of the female component 30. When the fuel connector 26 is fully coupled (as best shown in FIG. 4), apexes 68 of each barb 42, 44 are press fitted against the inner face 60 of the tubular segment 54 of the female component 30 for a fuel resistant seal.

When the fuel connector 26 is fully coupled, each one of the reinforcement rings 56, 58 are in a predefined axial relationship with a respective one of the barbs 42, 44 when connected. In one example, the reinforcement ring 58 is axially located behind the barb 44, and the reinforcement ring 56 is axially located behind the barb 42 (i.e., with respect to the insertion direction 66 of the male component 28). In one embodiment, and when fully coupled, the reinforcement ring 58 is axially centered between the barbs 42, 44. In one example, and when the fuel connector 26 is fully coupled, the barbs 42, 44 and the tubular segment 54 of the female component 30 will undergo limited plastic deformation. The reinforcement rings 56, 58 are adapted to limit plastic deformation of the tubular segment 54, while providing an optimal seal.

In one embodiment, and when the fuel connector 26 is fully coupled, the apexes 68 of each barb 42, 44 may be, at least in part, resiliently deformed (i.e., flexed radially inward) because of the biased contact against the inner face 60 of the female component 30. In addition, the inner face 60 may be resiliently flexed radially outward because of the same contact. In one example, flexing of the inner face 60 (i.e., that portion located axially between the reinforcement rings 56, 58), causes the entire wall of the tubular segment 54 of the female component 30 to flex, or distort radially outward. This flexing of the tubular segment 54 creates an external humped appearance of the tubular segment 54. Such humped appearances are axially aligned to the location of each respective barb 42, 44. The reinforcement rings 56, 58 act to limit, or restrict, the distortion of the tubular segment 54. That is, distortion of the tubular segment 54 at the axial locations of the reinforcement rings 56, 58 is minimal, or non-existent.

Figure 5:
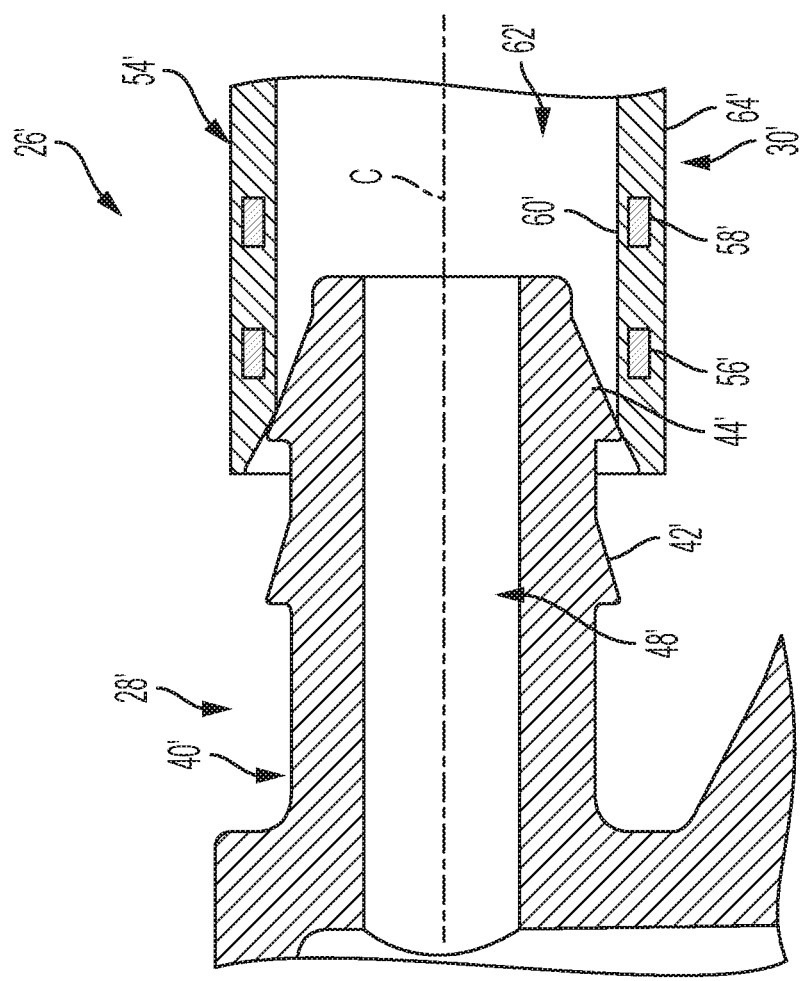
FIG. 5 is a cross section of a second embodiment of the fuel connector.

Referring to FIG. 5, a second embodiment of a fuel connector is illustrated wherein like elements to the first embodiment have like identifying numerals except with the addition of a prime symbol suffix. A female component 30' of a fuel connector 26' includes a segment 54' that may be tubular and at least one reinforcement ring (i.e., two illustrated as 56', 58'). The tubular segment 54' includes an inner face 60' that defines a cavity 62' for receipt of a male component 28', and an opposite outer face 64'. The reinforcement rings 56', 58' are embedded in the tubular segment 54' and between the faced 60', 64'.

The reinforcement rings 56', 58' are made of a material that is stronger than the material of the tubular segment 54'. For example, the tubular segment 54' may be made of injection molded plastic and the reinforcement rings 56', 58' may be made of metal (e.g., steel). The reinforcement rings 56', 58' provide increased strength to female component 30' at the location of reinforcement rings 56', 58', and therefore increased resistance to deformation, compared to the portions of female component 30' that are immediately ahead of and behind reinforcement rings 56, 58

Advantages and benefits of the present disclosure include a fuel connector that is easily coupled utilizing few part, and not requiring separate seals (e.g., O-rings), clamps and/or snaps, and separate hoses. Other advantages include a connector providing improved packaging (i.e., a compact design), a robust design and reduced costs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A fuel connector adapted to flow fuel, the fuel connector comprising:
    a male component including a plurality of barbs each projecting radially outward, spaced axially from one-another and being circumferentially continuous; and
    a female component including a plurality of reinforcement rings which provide increased strength to the female component at a location of each of the plurality of reinforcement rings and therefore increased resistance to deformation compared to other portions of the female component that are immediately ahead of and behind the plurality of reinforcement rings, each one of the plurality of reinforcement rings being in a predefined axial relationship with a respective one of the plurality of barbs when connected;
    wherein each one of the plurality of reinforcement rings is axially located behind a respective one of the plurality of barbs and with respect to an insertion direction of the male component and wherein adjacent ones of the plurality of reinforcement rings provide a recess which extends radially outward from said female component and axially between the adjacent ones of the plurality of reinforcement rings such that the recess is empty and radially surrounds one of the plurality of barbs.

2. The fuel connector set forth in claim 1, wherein adjacent barbs of the plurality of barbs are axially spaced by a first distance, adjacent reinforcement rings of the plurality of reinforcement rings are axially spaced by a second distance, and the first distance is equal to the second distance.

3. The fuel connector set forth in claim 1, wherein each ring of the plurality of rings project radially outward.

4. The fuel connector set forth in claim 3, wherein the male component is a unitary, single, and homogenous piece made of plastic.

5. The fuel connector set forth in claim 4, wherein the female component is a unitary, single, and homogenous piece made of plastic.

6. The fuel connector set forth in claim 3, wherein at least one of the male and female components are made of acetal conductive copolymer.

7. The fuel connector set forth in claim 3, wherein the plurality of barbs form a fir tree.

8. The fuel connector set forth in claim 3, wherein the male component includes a tubular portion having an inner surface defining a channel for the flow of fuel and an opposite outer surface, and the plurality of barbs project radially outward from the outer surface.

9. The fuel connector set forth in claim 8, wherein the female component includes a tubular segment having an inner face defining a cavity for receipt of the male component, and an opposite outer face, and the plurality of rings project radially outward from the outer face.

10. A fuel connector adapted to flow fuel, the fuel connector comprising:
    a male component including a tubular portion defining a channel for the flow of fuel along a centerline, and a plurality of barbs each projecting radially outward from the tubular portion, spaced axially from one-another and being circumferentially continuous; and
    a female component including a tubular segment defining a cavity extending along the centerline and adapted to receive the male component, and a plurality of reinforcement rings being circumferentially continuous and projecting radially outward from the tubular segment, the plurality of reinforcement rings providing increased strength to the female component at a location of each of the plurality of reinforcement rings and therefore increased resistance to deformation compared to other portions of the female component that are immediately ahead of and behind the plurality of reinforcement rings, and the plurality of reinforcement rings being a unitary part of the tubular segment such that each one of the plurality of reinforcement rings is axially located behind a respective one of the plurality of barbs with respect to an insertion direction of the male component and when the fuel connector is coupled, wherein adjacent ones of the plurality of reinforcement rings provide a recess which extends radially outward from said female component and axially between the adjacent ones of the plurality of reinforcement rings such that the recess is empty and radially surrounds one of the plurality of barbs.

11. The fuel connector set forth in claim 10, wherein the male and female components are made of injection molded plastic.

12. A fuel system comprising:
    a first fuel connector including male and female components, the male component including a tubular portion defining a channel for the flow of fuel along a centerline and a plurality of barbs each projecting radially outward from the tubular portion, spaced axially from one-another and being circumferentially continuous, and the female component including a tubular segment defining a cavity extending along the centerline and adapted to receive the male component and a plurality of reinforcement rings being circumferentially continuous and projecting radially outward from the tubular segment, the plurality of reinforcement rings providing increased strength to the female component at a location of each of the plurality of reinforcement rings and therefore increased resistance to deformation compared to other portions of the female component that are immediately ahead of and behind the plurality of reinforcement rings, and the plurality of reinforcement rings being a unitary part of the tubular segment such that each one of the plurality of reinforcement rings is axially located behind a respective one of the plurality of barbs with respect to an insertion direction of the male component and when the first fuel connector is coupled, wherein adjacent ones of the plurality of reinforcement rings provide a recess which extends radially outward from said female component and axially between the adjacent ones of the plurality of reinforcement rings such that the recess is empty and radially surrounds one of the plurality of barbs;
    a fuel filter; and
    a fuel fitting, the first fuel connector being carried between the fuel filter and the fuel fitting providing fluid communication between the fitting and the fuel filter.

13. The fuel system set forth in claim 12, wherein the fuel filter includes a housing and one of the male and female components is an integral and unitary part of the housing.

14. The fuel system set forth in claim 13, wherein the other of the male and female components is an integral and unitary part of the fitting.

15. The fuel system set forth in claim 14, further comprising:
    a fuel pump in fluid communication with the fuel filter via the fitting, the fuel pump including a pump housing; and
    a second fuel connector including male and female components, the male component including a tubular portion defining a channel for the flow of fuel along a centerline and a plurality of barbs each projecting radially outward from the tubular portion, spaced axially from one-another and being circumferentially continuous, and the female component including a tubular segment defining a cavity extending along the centerline and adapted to receive the male component and a plurality of reinforcement rings being circumferentially continuous and projecting radially outward from the tubular segment, the plurality of reinforcement rings providing increased strength to the female component at a location of each of the plurality of reinforcement rings and therefore increased resistance to deformation compared to other portions of the female component that are immediately ahead of and behind the plurality of reinforcement rings, and the plurality of reinforcement rings being a unitary part of the tubular segment such that each one of the plurality of reinforcement rings is axially located behind a respective one of the plurality of barbs with respect to an insertion direction of the male component when the second fuel connector is coupled, wherein adjacent ones of the plurality of reinforcement rings provide a recess which extends radially outward from said female component and axially between the adjacent ones of the plurality of reinforcement rings such that the recess is empty and radially surrounds one of the plurality of barbs, and one of the male and female components of the second fuel connector is an integral and unitary part of the pump housing.

16. The fuel system set forth in claim 15, wherein the other of the male and female components of the second fuel connector is an integral and unitary part of the fitting.

17. The fuel system set forth in claim 12, wherein the circumferentially continuous barb is one of a plurality of circumferentially continuous barbs axially spaced from one-another, and the reinforcement ring is one of a plurality of reinforcement rings axially spaced from one-another, and wherein each one of the plurality of circumferentially continuous barbs are axially located behind a respective one of the plurality of reinforcement rings and with respect to an insertion direction of the male component.

* * * * *